United States Patent [19]

Rabinowitz et al.

[11] 4,454,016
[45] Jun. 12, 1984

[54] REMOVAL OF PCB FROM OIL AND OTHER LIQUIDS

[75] Inventors: Mario Rabinowitz, Redwood City; Narain G. Hingorani, Los Altos Hills; E. Robert Perry, Portola Valley, all of Calif.

[73] Assignee: Electric Power Research Institute, Inc., Palo Alto, Calif.

[21] Appl. No.: 310,518

[22] Filed: Oct. 13, 1981

[51] Int. Cl.³ .......................... B03C 5/02; C10G 33/02
[52] U.S. Cl. .................................... 204/308; 204/302; 204/305; 204/188
[58] Field of Search ............................. 204/302–308, 204/186–191

[56] References Cited

U.S. PATENT DOCUMENTS

| | | | |
|---|---|---|---|
| 2,067,345 | 1/1937 | Roberts et al. | 204/24 |
| 2,534,907 | 12/1950 | Ham et al. | 204/188 |
| 3,197,393 | 7/1965 | McEven | 204/180 |
| 3,368,963 | 2/1968 | Hall | 204/302 |
| 3,415,735 | 12/1968 | Brown et al. | 204/302 |
| 3,476,678 | 11/1969 | Murdock | 204/308 |
| 3,484,362 | 12/1969 | Van Vroonhoven | 204/302 |
| 3,857,770 | 12/1974 | Keller | 204/188 |
| 3,909,383 | 9/1975 | Sato | 204/186 |
| 4,072,596 | 2/1978 | Moeglich | 204/241 |
| 4,276,179 | 6/1981 | Soehngen | 210/679 |

Primary Examiner—Howard S. Williams
Assistant Examiner—T. L. Williams
Attorney, Agent, or Firm—Flehr, Hohbach, Test, Albritton & Herbert

[57] ABSTRACT

A technique is disclosed herein for separating out one group of polar particles for example PCB molecules having polar moments of given magnitudes, from a separate group of polar particles, for example oil molecules having polar moments of lesser magnitude, in a mixture of the two. This is accomplished by utilizing a chamber containing a substance which has an affinity for the first particle, preferably neoprene in the case of PCB. The substance is carried by arrangements of electrodes or the like which produce a non-uniform electric field in the chamber which causes the first particle, e.g. the PCB, to be attracted toward the substance carried by the electrodes, e.g., the neoprene, faster than the second particles. In this way, first particles are separated out from the mixture and are absorbed by a particle collecting substance of suitable type.

10 Claims, 10 Drawing Figures

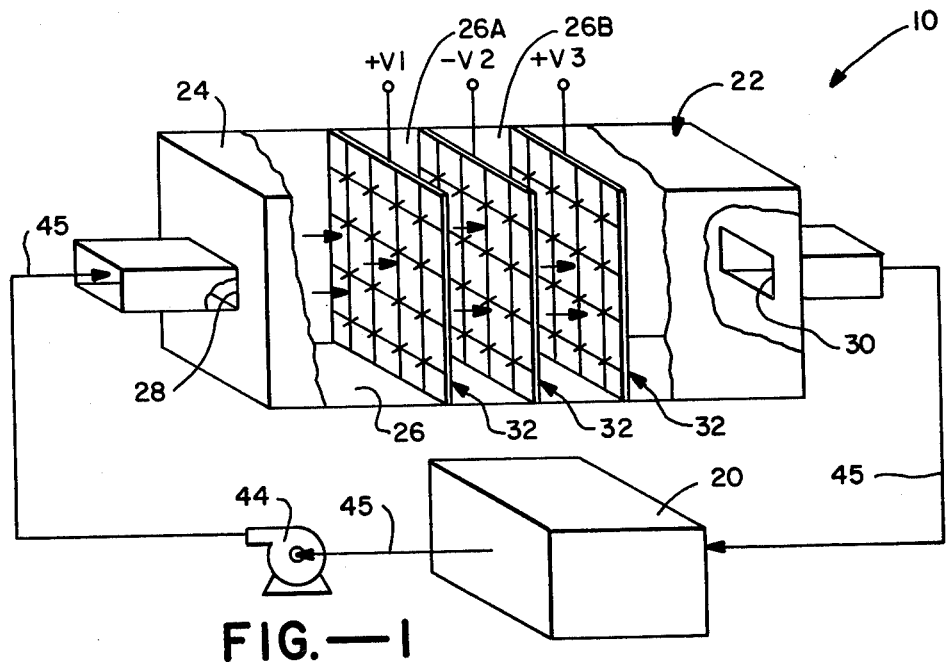
FIG.—1
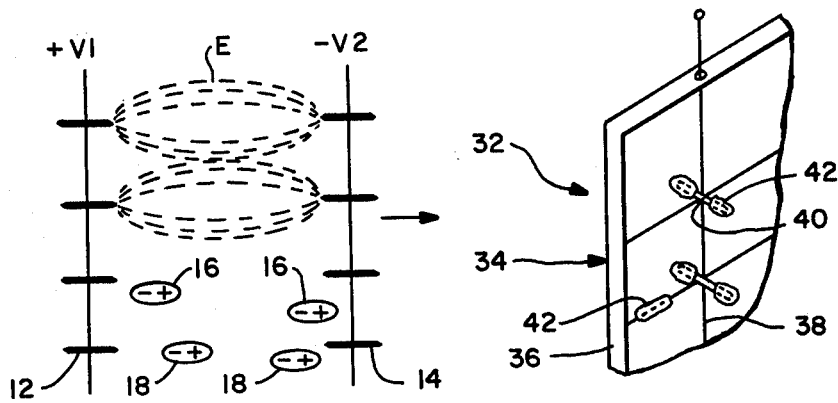
FIG.—2
FIG.—3
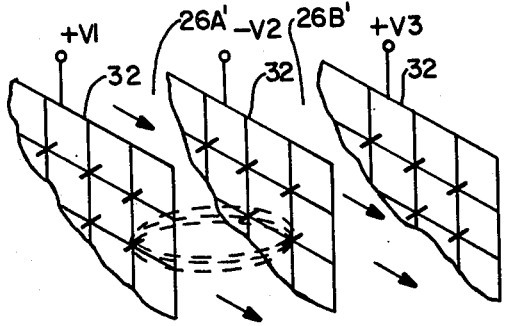
FIG.—4

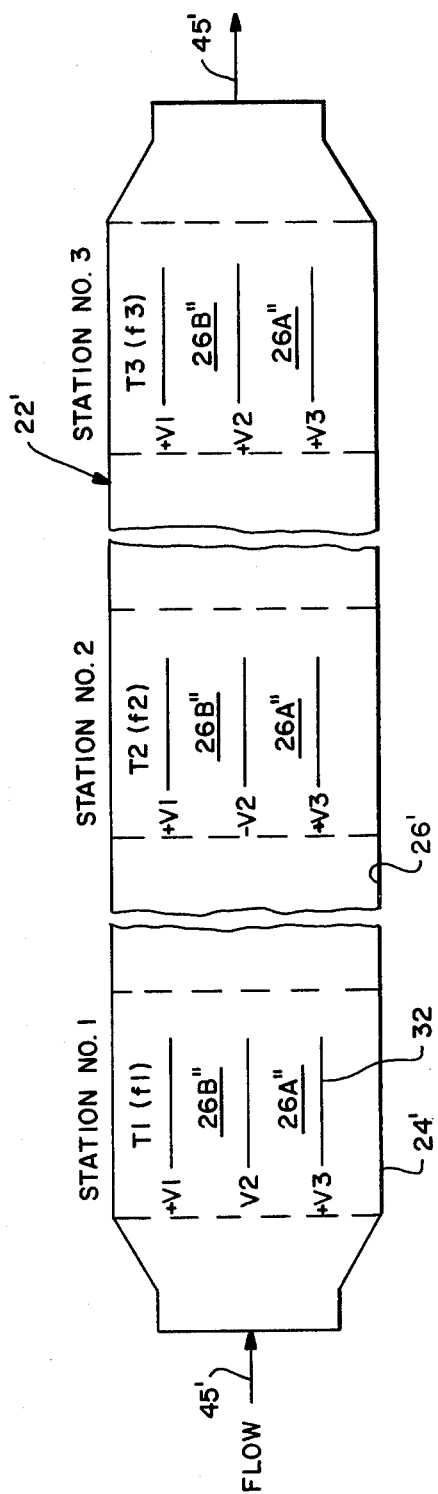
FIG.—5
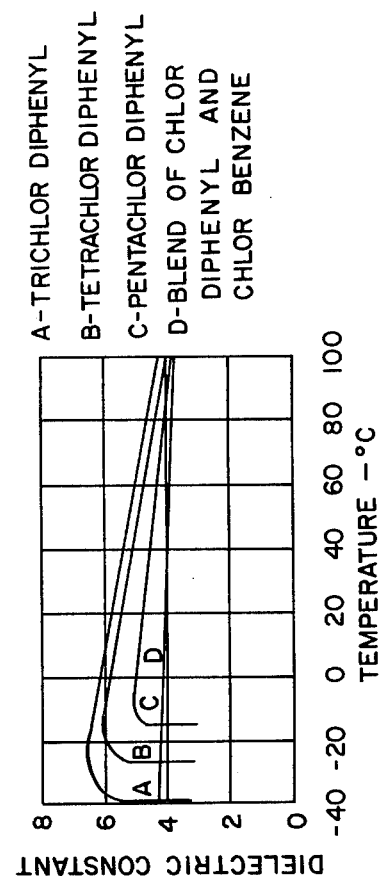
FIG.—7
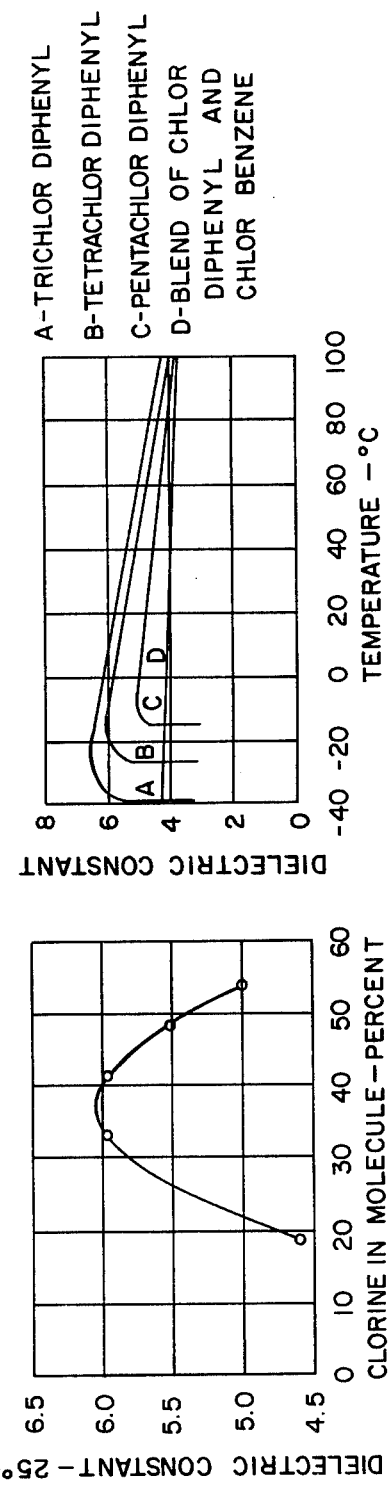
FIG.—6

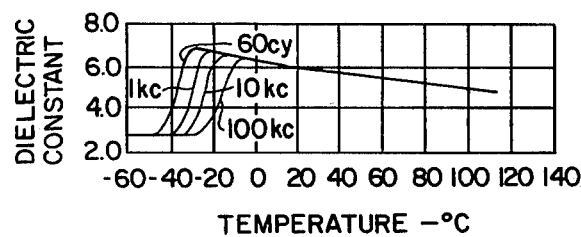
FIG.—8
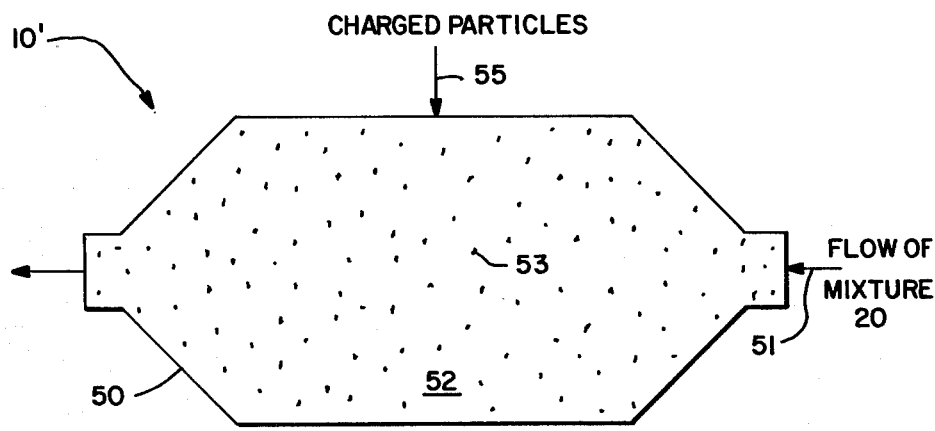
FIG.—9
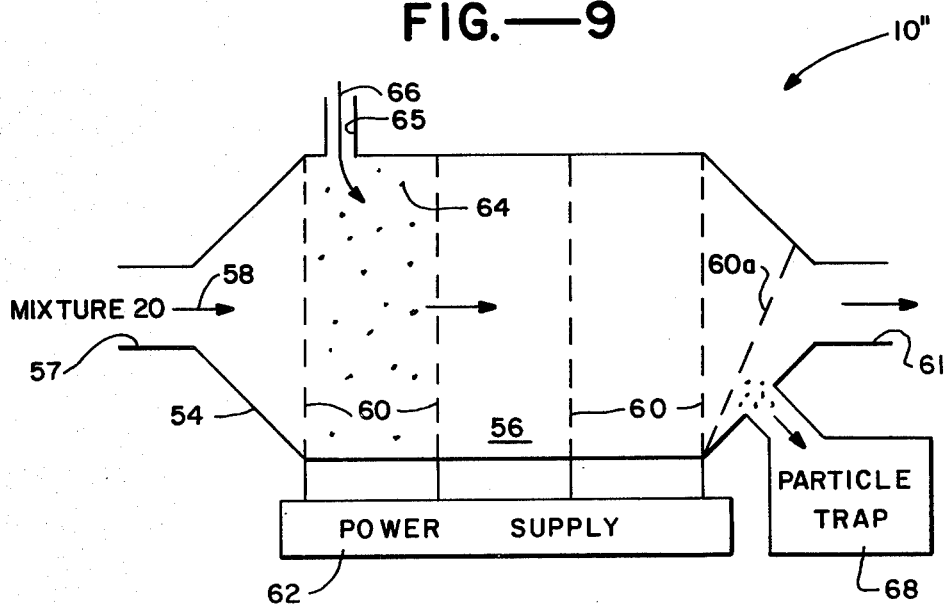
FIG.—10

REMOVAL OF PCB FROM OIL AND OTHER LIQUIDS

The present invention relates generally to techniques for separating out certain particles from other particles in a mixture of the two and more particularly to a system or method of separating out specific molecules such as polychlorinated biphenyls (PCB) or other such polar particles having given polar moments from other polar particles such as oil molecules having polar moments of lesser magnitudes.

It is presently believed that polychlorinated biphenyls and tri and tetrachlorobenzenes (which will be referred to hereinafter as PCB, TCB and when blended together as TPCB) may be toxic. Even very small concentrations of PCB, e.g., on the order of 100 to 500 ppm, in transformer oils and other liquids to which the environment may be inadvertently exposed have been required to be removed. However, present filtering methods to accomplish this have been found to be difficult, time consuming and therefore quite costly.

Accordingly, it is a primary object of the present invention to provide an uncomplicated, reliable and economical system for and method of separating PCB molecules which are polar in nature and other polar particles having given polar moments from still other polar particles such as oil molecules having polar moments of lesser magnitudes. As will be described in more detail hereinafter, this is accomplished by utilizing means defining at least one chamber section containing therein spaced-apart electrodes which carry particle collecting substances displaying an affinity for the particles being separated out, for example, the PCB particles, sufficient to absorb the particles when they are nearby. Means are also provided for applying a non-uniform electric field between the spaced-apart electrodes. Thus, a mixture containing the particles to be separated from one another, for example, higher polar moment PCB molecules and lower moment oil molecules, can be placed in the chamber section and subjected to the non-uniform electric field. This, in turn, will cause the polar particles having greater polar moments, e.g., the PCB molecules, to be attracted to one or the other of the electrodes faster than the polar particles of lesser moment, e.g., the oil molecules, thereby separating out the lower electric polar moment particles or molecules from those of higher electric polar moment. As a result, the particle collecting substance, preferably neoprene in the case of PCB molecules, will absorb the intended particles or molecules, thereby eliminating them from the mixture. The dipole moment is generally of greatest importance, although quadruple and higher order multipole moments can also be significant.

In a preferred embodiment of the present invention and one which is especially suitable for use in separating out PCB molecules from a mixture including these and oil molecules, a mixture of the two is subjected to the non-uniform field in an associated chamber at different temperatures. In this way, PCB molecules having polar moments which are greater than the polar moments of the oil molecules at one temperature but not necessarily the other can be readily removed along with the PCB molecules having greater dipole moments at the other or both temperatures. A single chamber section may be utilized to accomplish this, in which case the PCB/oil mixture would be provided in that chamber section at both temperatures. On the other hand, separate chamber sections having their own associated non-uniform electric fields and particle collecting substances could and preferably would be utilized.

The various embodiments of the present invention briefly discussed above as well as other embodiments and associated features will be described in more detail hereinafter in conjunction with the drawings wherein:

FIG. 1 is a schematic illustration, partially in perspective view, of an overall system for separating out one group of polar particles from a second group in a mixture of the two, in accordance with the present invention;

FIG. 2 schematically illustrates an operational aspect of the system illustrated in FIG. 1;

FIG. 3 is an enlarged perspective view illustrating an electrode arrangement forming part of the system shown in FIG. 1;

FIG. 4 is a perspective view of a modified version of the system illustrated in FIG. 1;

FIG. 5 is a diagrammatic illustration of another modified version of the system illustrated in FIG. 1;

FIGS. 6–8 graphically illustrate how the dielectric constants of different PCB molecules are affected by chlorine content, temperature and field frequency; and FIGS. 9 and 10 diagrammatically illustrate modified embodiments of the system illustrated in FIG. 1.

Turning now to the drawings, wherein like components are designated by like reference numerals throughout the various figures, attention is first directed to FIG. 1. This figure illustrates a system 10 for separating out a first group of polar particles having given polar moments from a second group having given polar moments of lesser magnitudes in a mixture of the two. The system is especially suitable for separating out PCB molecules from a mixture including these and oil molecules. Therefore, for purposes of clarity, system 10 will be specifically described with regard to the way in which it acts on this particular PCB/oil mixture. At the same time, it will be apparent that the system may be utilized with other types of mixtures containing polar particles of lesser and greater dipole moments.

Before turning to the specific components making up system 10 and in order to fully understand how this system functions, it is important to understand how the PCB and oil molecules are affected in an electric field and the reasons why. To this end, reference is made to FIG. 2 which illustrates a first group of interconnected electrodes 12 which are energized by a potential $+V_1$ and a second group of interconnected electrodes 14 which are maintained at a lesser potential $-V_2$ which may or may not be ground potential. In any case, the two sets of electrodes are positioned in spaced relationship with one another so as to produce a non-uniform electric field E therebetween, as partially indicated by dotted lines. Two PCB molecules generally indicated at 16 and two oil molecules 18 are shown between electrodes 12 and 14 in non-uniform electric field E.

It is important to note that both types of molecules 16 and 18 in field E possess their own permanent and/or induced polar moments which are free to change orientation in an applied non-uniform electric field. Thus, as illustrated in FIG. 2, the PCB and oil molecules closer to electrodes 12 are disposed in the manner shown, that is, with their negative sides oriented towards the more positive electrodes. At the same time, the PCB and oil molecules closer to electrodes 14 are similarly disposed such that their positive sides are oriented towards the more negative or ground electrodes. The electric field functions to orient the molecules, and by its non-uniformity, to attract the molecules to the regions of increasing field and hence increasing force upon them. The non-uniform field is stronger as positions are approached toward the electrodes from intermediate points therebetween. In theory, a polar molecule such as those shown could find itself in a position exactly between the two groups of electrodes such that the net force acting on it by the field is zero. However, this is an unstable state of equilibrium and is in practice a highly remote possibility, since the molecules being separated and, in fact, the entire mixture is in a dynamic state, e.g., a flowing stream.

Still referring to FIG. 2, it should be further noted that different polar particles have permanent and/or induced electric dipole moments which differ in magnitude from one another as evidenced by their respective dielectric constants. For example, transformer oil molecules of either parafinic or napthalic base are characterized by relatively low dielectric constants, e.g., on the order of 2.2 to 2.3 at room temperature (25° C.). On the other hand, many but not all PCB molecules are characterized by relatively high dielectric constants at room temperature, e.g. as high as 5.8. Therefore, a molecule characterized by a larger dielectric constant and therefore a greater dipole moments, for example, a PCB molecule 16, will be subjected to a greater force by field E than the molecules characterized by smaller dielectric constants and therefore dipole moments of lesser magnitude, for example, the oil molecules 18. As a result, the molecules 16 will be drawn to their respective electrodes with greater force and therefore faster than the otherwise adjacent molecules 18, thereby causing the higher moment PCB molecules to separate out from the lower moment oil molecules.

It should be noted from the foregoing, that the field E must be non-uniform as in accordance with the present invention. Otherwise (if the field were uniform), polar particles would not be attracted to one electrode over the other since the net force on these particles would be zero. On the other hand, the non-uniform field can be a DC field or an AC field since the particles are free to change orientation. Thus, in an AC field, when for example the electrodes 12 change polarity, the adjacent molecules 16 and 18 will change orientation that is, rotate 180° relative to electrodes 12, simply change polarity by induction.

Returning to FIG. 1, attention is now directed to the various components making up system 10. These components include a supply 20 of transformer oil including mainly oil molecules of either the parafinic or napthalic base recited above and small concentrations of PCB molecules, e.g., 100 to 500 ppm. For purposes of the present discussion, it will be assumed that all of the PCB molecules are characterized by relatively high dielectric constants, that is, as high as 5.8 and, in any event, higher than the dielectric constants of the oil molecules, without taking into account the particular temperature of the mixture or the frequency of field E (assuming an AC field). System 10 also includes an assembly generally indicated at 22 which is designed in accordance with the present invention for reliably and economically separating out the higher polar order PCB molecules from the oil mixture 20 in an uncomplicated way. To this end, assembly 22 includes a housing 24 defining an inner chamber 26, an inlet 28 into the chamber at one end thereof and an outlet 30 at the opposite end of the chamber.

Chamber 26 is separated into a number of chamber sections by a plurality of electrode arrangements 32. In the specific assembly illustrated, three such arrangements are provided, a portion of one of which is specifically illustrated in FIG. 3. Each arrangement includes an electrically conductive grid 34 comprised of an outer frame 36 and cross wires 38 extending in a grid-like fashion across the frame. As best illustrated in FIG. 3, elongated needle-like electrodes 40 are electrically connected to and supported at the various junctures of wires 38 so as to project out from opposite sides of the grid in directions normal thereto. The three electrodes arrangements are disposed within and extend entirely across chamber 26 in longitudinally spaced, parallel planes normal to the longitudinal axis of housing 24. In this way, the center arrangement and one end arrangement together define a chamber section 26a while the center arrangement and the other end arrangement together define a second chamber section 26b.

Each of these chamber sections 26a,26b serves to contain a non-uniform electric field E of the type described with regard to FIG. 2. In order to accomplish this, the three electrode arrangements 32 are respectively maintained at different potentials $+V_1$, $-V_2$ and $+V_3$, as illustrated schematically in FIG. 1. These three potentials can be either AC or DC and the potentials $+V_1$ and $+V_3$ can be identical, for example from the same positive source and the potential $-V_2$ can be either a positive or a negative potential less than that of the potential $+V_1$ and $+V_3$ or it can be maintained at ground potential. On the other hand, the center electrode arrangement can be maintained at a higher potential than the end arrangements. Thus, a single power supply could be utilized. In any event, the resultant fields between the three electrode arrangements are to be non-uniform fields corresponding to the field E, described previously.

For reasons to be discussed in detail hereinafter, the end sections of each of the electrodes 40 disposed within either one of the electric field containing chamber sections 26a,26b is coated or otherwise provided with a substance generally indicated at 42 in FIG. 3. This substance is selected to have an affinity for the PCB molecules sufficient to absorb the molecules when the two come in contact with one another or are in close proximity to one another. In other words, substance 42 serves as a means of absorbing out of the oil mixture any higher order PCB molecules which are attracted to or otherwise come in contact with the substance. The wire grid work may also be coated with the substance 42 (as shown in FIG. 3) as the electric field is also non-uniform near the grid wires. In a preferred embodiment, this substance 42 is neoprene which has been shown to have the appropriate affinity for PCB molecules, although it is not entirely clear exactly how its affinity mechanism functions. It is believed that an absorption process takes place between the PCB molecules and like molecules such as TCB (the blend of which are referred to herein as TPCB) and the neoprene which is a polychloroprene, i.e., poly(2-chloro-1,3-butadine). It is believed that this process is carried out by the formation of chemical bonds. The chlorine atoms which are part of the PCB molecules are believed to become bonded (chemically) to the neoprene. Similarly, the chlorine atoms in the neoprene become bonded (chemically) to the TPCB. The result is a "least energy" state where the chlorine atoms are shared between the molecules. Thus, the TPCB molecules form cross-links between the neoprene molecules. This process produces a macromolecule which is a hybrid of the TPCB and neoprene. The overall process is indirectly evidenced by the softening and swelling of the neoprene as it absorbs the PCB molecules and can be directly shown by actually measuring a decrease in TPCB in a given oil sample subjected to this absorption process.

Having decreased assembly 22, attention is now directed to the way it functions in overall system 10. To this end, suitable means such as pump 44 is provided for directing a continuous stream of oil from supply 20 into chamber 26 through entry 28, as indicated by arrows 45. This stream of oil passes through the chamber and specifically into and through sections 26a and 26b across electrode arrangements 32 and thereafter out of the chamber through exit 30. Flow path 45 can be a closed path as illustrated in FIG. 1 or it can be opened, that is, calling for a single pass through assembly 22. In either case, as the oil passes through either chamber section 26a or 26b its TPCB molecules and its oil molecules are affected by the non-uniform electric fields in these chamber sections in the manner described with regard to FIG. 2. In other words, all of the polar molecules in either one of the chamber sections 26a,26b are attracted to one or the other of the electrode arrangements in that chamber section. Those molecules characterized by higher dielectric constants, e.g., the higher moment TPCB molecules, are drawn to the associated grids 34 with greater force than those molecules characterized by lower dielectric constants, e.g., the lower electric moment oil molecules, as indicated previously. In this way, the non-uniform electric fields serve to separate out the TPCB molecules from the oil molecules and also serve to draw them into contact with the neoprene for permanently separating them from the mixture. The flow rate of the oil through chamber 26 is adjusted to maximize the TPCB removal rate. More specifically, the intensity in each of the non-uniform electric fields and the flow rate should be selected so as to allow the TPCB molecules to be not only separated from the oil molecules in the mixture but also to be attracted sufficiently close to the electrodes to be absorbed by the neoprene while the oil molecules are carried away by the flow of the mixture through the chamber. The particular magnitude of each field E and of the specific flow rate for best results can be readily determined by one with ordinary skill in the art, depending on the particular mixture and particles being separated. Obviously, even in the absence of fields E, some of the TPCB molecules will come in contact with the neoprene. However, the presence of these fields assures that a substantially greater number will do so, thereby increasing efficiency of the overall process.

Having described system 10 both structurally and functionally, it is to be understand that the present invention is not limited to the specific embodiment described. For example, as stated previously, the principles which underlie this system are valid for systems which are intended to separate most other polar particles having given electric moments from polar particles having moments of lesser magnitudes. Thus, the particular type of particle collecting substance 42 utilized will depend upon the specific polar particles being separated out of a given mixture. Moreover, this substance can be merely coated onto the various electrodes 40 and grid wires 38 as illustrated in FIG. 3 or it can be provided in other ways. For example, each entire electrode arrangement 32 including its grid 34 could be coated or, for purposes of convenience, a separate mesh-like (open-porosity) layer of substance 42 could be disposed across and directly against each electrode arrangement. In this latter case, when a given separate layer of substance 42 becomes saturated with the particles being absorbed (or otherwise retained by suitable mechanisms, such as physical adherence), the separate layer can be readily removed and replaced with a new layer.

In addition to the various modifications just recited which could be made to system 10, it should be noted that the electrode arrangements 32 do not have to extend transverse to the flow path of mixture 20 through chamber 26. As illustrated in FIG. 4, these arrangements could be disposed in a direction parallel to the flow of oil so as to define parallel chamber sections 26a' and 26b'. In this case, the non-uniform electric field in each chamber section extends transverse to the flow path, as indicated by dotted lines in FIG. 4. Thus, as the oil mixture flows through these chamber sections, the higher moment polar molecules are attracted to one side or the other faster than the lower moment molecules. In this regard, the flow rate should be selected to allow the higher moment molecules to reach the electrode arrangements while carrying away the lower moment molecules. Otherwise, the system functions in the same way as previously described system 10. Moreover, it is within the contemplation of the present invention to provide more than two chamber sections 26 whether they are transverse to or parallel with the flow of oil and it is equally possible to provide a single chamber section.

From the foregoing, it should be apparent that only those polar molecules or other such particles having greater electric polar moments relative to other such molecules or particles can be separated out of a mixture of the two in an efficient manner. Thus, in the case of PCB molecules, those having greater dipole moments as evidenced by their dielectric constants can be efficiently separated out of an oil mixture containing oil molecules characterized by dielectric constants of lesser magnitudes. However, at a given temperature, for example room temperature (25° C.), not all of the PCB molecules in a typical supply of transformer oil have the same dielectric constants and therefore they do not all have the same dipole moments. Some of these PCB molecules are characterized by dielectric constants as low as or approximately as low as the oil molecules. On the other hand, applicants have found that the dielectric constants of PCB molecules vary with temperature in an electric field at a given frequency, for example, a frequency of 1 kHz. More important, it has been found that those PCB molecules having relative low dielectric constants at one temperature can be made to display substantially greater dielectric constants at another temperature. This is best illustrated in Table I below, and the graphs of FIGS. 6–8 to be discussed hereafter. Table I sets forth the dielectric constants for a number of different types of PCB molecules at 25° C. and also at 100° C. within an AC electric field having a frequency of 1 kHz. The description of each type of PCB molecule shown in Table I is unimportant for purposes of the present invention and, hence will not be described here. It suffices to say that one can readily determine how the dielectric constants of different PCB molecules will change with temperature (and also with frequency, as will be discussed) in a given mixture.

TABLE I (Dielectric Constants of PCB at 1000 Hz)

| 25° C. | 100° C. |
|---|---|
| 5.7 | 4.6 |
| 5.8 | 4.9 |
| 5.6 | 4.6 |
| 5.0 | 4.3 |
| 4.3 | 3.7 |
| 3.0 | 4.9 |
| 2.7 | 4.2 |
| 2.5 | 3.7 |
| 2.7 | 3.3 |

Assuming for the moment that oil mixture 20 described above contains the PCB molecules shown in Table I, it should be apparent that if this mixture is maintained at room temperature, those PCB molecules having dielectric constants which are below 3.0 will be attracted to electrode arrangements 26a,26b only slightly faster than the oil molecules which have nearly the same dielectric constant. However, applicants have not only found that changing the temperature of the oil mixture, for example increasing it from 25° C. to 100° C., increases the dielectric constants of the lower moment PCB molecules (as indicated in Table I) but that this change in temperature has no appreciable effect on the oil molecules. Thus the dielectric constants of these latter molecules remain unchanged. As a result, system 10 as described previously can be modified such that oil mixture 20 passes through either or both of the chamber sections 26a,26b at varying temperatures, for example at 25° C. and 100° C. In this way, the higher order PCB molecules (at 25° C.) can be removed and, at a different time, for example during a second pass through assembly 22 or in a second or third chamber section thereof, the oil can be provided at the higher temperature for removing the previously lower moment PCB molecules.

Referring to FIG. 5, an assembly 22' which is provided specifically for maintaining the oil mixture 20 at different temperatures is shown. This assembly, like assembly 22 includes an overall housing 24' and three longitudinally spaced sets of electrode arrangements 32. While these sets of electrodes are shown parallel to the flow path 45', they could be transverse thereto as shown in FIG. 1. In the particular assembly illustrated in FIG. 5, each set of electrode arrangements defines two chamber sections 26a'' and 26b''. Moreover, the various electrode arrangements are appropriately energized to produce associated non-uniform electric fields. Moreover, in the case of assembly 22', the first pair of chamber sections 26a'',26b'' which may be referred to as station 1 receives the flow of oil at room temperature and thereby separates out those higher moment PCB molecules at that temperature. Thereafter, the oil passes through a section of chamber 26' which serves as heating station $H_1$. In this station, means are provided for heating the oil to a second elevated temperature, for example, a temperature between 25° C. and 100° C. The oil then passes into a second pair of chamber sections 26a'', 26b'' (station 2) for separating out some of the previously lower order PCB molecules (at room temperature) but are now elevated polar moment molecules (as a result of heat). After passing through station 2 the oil mixture passes into still another heating station $H_2$ which includes means for heating the oil to an even higher temperature, for example 100° C. Thereafter, the oil passes through another separating station, e.g. Station 3, and finally out of the housing.

It should be obvious from the foregoing that assembly 22' could include more than three separating stations so as to more gradually heat up oil mixture 20. On the other hand, as discussed briefly above, a single station could be utilized and the oil could be continuously heated up or otherwise changed in temperature (depending on the types of PCB particles present) and caused to make several passes through the same or different stations.

In addition, applicants have found that they can vary the dielectric constants (and hence the dipole moments) of the PCB molecules by varying the frequency of the non-uniform electric fields (see FIG. 8). In this way, it is possible to "fine tune" assembly 22'. More specifically, by maintaining the field E in station 1 at a frequency f1 and by maintaining the fields in stations 2 and 3 at, for example, different frequencies f2 and f3, it is possible to maximize the efficiency of assembly 22'. The particular values for temperatures T1, T2, T3, and so on, and the values for frequencies f1, f2, f3, and so on, could be readily provided by means of routine experimentation (in view of the present disclosure) in order to optimize the particle separating capabilities of assembly 22'. Moreover, it is to be understood that the utilization of these temperature and frequency variations are not limited to separating out PCB molecules, but rather any other polar particles having dipole moments which are sensitive to these parameters in the same way as the PCB molecules.

Referring to FIGS. 6-8, the graphs shown there illustrate how the dielectric constants of some PCB type molecules vary with temperature and frequency. It is to be understood that the particular molecules represented in these graphs do not necessarily include those shown in Table I above. Moreover, it is to be understood that the graphs (and also Table I) are provided for exemplary purposes only.

FIG. 6 illustrates the effect of chlorination on the dielectric constant of the hydrocarbon diphenyl. It will be observed that a dielectric constant about 6 at 20° C. occurs with certain degrees of chlorination.

The dielectric constant of the chlorinated diphenyl, however, increases rapidly as the solidification point is approached. The effect of temperature change on the dielectric constant of typical chlorinated diphenyls of commercial use is illustrated in FIG. 7. At temperatures below 20° C., values of between 4 and 6 are readily obtained as the graph shows. For trichlor diphenyl a value in excess of 6 and increasing occurs as the temperature is decreased below 10° C.

The graph of FIG. 8 illustrates the effects that temperature and frequency have on chlorinated aromatic PCB (Askarel Liquids). These liquids have been primarily used for fire-resistant transformers and capacitors. They are biphenyl with 2 to 6 chlorine atoms attached to the rings. They are used alone or mixed with tri- or tetrachlorobenzene (PCB and TPCB). The liquids used have viscosities similar to transformer oil.

Referring now to FIGS. 9 and 10, attention is directed to modified systems 10' and 10'' for separating out a first group of polar particles having given polar moments from a second group having polar moments of lesser magnitudes in a mixture of the two, for example, mixture 20. Like system 10, systems 10' and 10'' are especially suitable for separating out PCB molecules from a mixture including these and oil molecules.

Therefore, for purposes of clarity, these two latter systems will be specifically described with regard to the way in which they act on this particular PCB/oil mixture. At the same time, it will be apparent that the system may be utilized with other types of mixtures containing polar particles of lesser and greater polar moments in the same manner described with respect to system 10.

With specific reference to FIG. 9, system 10' is shown including a housing 50 through which mixture 20 is caused to flow by means of a suitable pump or the like, as indicated by the arrows 51. At the same time, a chamber 52 defined within housing 50 contains a continuous supply of charged neoprene particles 53 which are placed therein by suitable means generally indicated by arrow 55. These particles are suitably charged by any suitable means, e.g., by means of an ionizer. Therefore, these particles not only serve to collect PCB molecules as described above, but also because of the net charges on them, they serve to produce inter-particle non-uniform electric fields within chamber 52. Thus, the PCB molecules respond to the charged neoprene particles 53 in the same way as the PCB molecules in system 10 respond to the neoprene coated ends of electrodes 40 (see FIG. 3). Obviously, as the charged particles saturate after absorbing PCB molecules they must be replaced. This can be accomplished intermittently by shutting down the system or by providing a continuous "fresh" supply of charged particles.

Referring to FIG. 10, modified system 10" is shown. This system also includes a housing which is generally indicated at 54 defining an internal chamber 56. The previously recited mixture 20 is directed into this chamber through an inlet 57, as indicated by the arrow 58. However, external pumping means or the like are not provided. Rather, a network of electrically conductive grids in combination with charged neoprene particles are utilized to carry the mixture through the chamber. More specifically, as seen in FIG. 10, system 10" includes an arrangement of spaced-apart electrically conductive grids 60 which extend across the chamber between inlet 57 and an outlet 61 and which are connected to a suitable AC power supply 62 for providing a series of AC fields within chamber 56. At the same time, charged neoprene particles 64 of like charge (which may be identical to those previously described particles 53) are directed into chamber 55 near one end thereof through an appropriate inlet 65, as indicated by arrow 66. The overall (and constantly changing) but preferably uniform AC field within chamber 56 is specifically selected to cause charged particles 64 to move through the chamber towards the outlet end thereof (the right side of the chamber as viewed in FIG. 10). At the same time, mixture 20 is caused to enter chamber 56 through inlet 57, for example by means of gravity. The moving particles 64 in part transfer their momentum to this mixture causing both to move through the chamber towards outlet 61.

Because the particles 64 are charged, the PCB molecules in the mixture respond to them in the manner described with regard to system 10'. In other words, the charged particles serve not only as a means of collecting the PCB molecules but also as a means of producing the necessary non-uniform electric field. This latter field must be contrasted with the changing field or fields produced by grids 60 which, as stated, is preferably a uniform field merely serving as an "electrical pump" or "electrical wind pump" for pumping the mixture 20 and charge particles through chamber 55 by means of an electric body force on the particles. In this regard, the very last grid indicated at 68 is preferably disposed at the angle shown so as to direct the charged particles towards a particle trap 68 below and in front of outlet 61 while the mixture 20 (less the absorbed PCB molecules) passes through the outlet.

The system 10" and system 10' can be either an open looped or a closed looped system in the same manner as previously described system 10. It is also to be understood that system 10' and system 10" are equally applicable for use in separating out other types of polar particles in the same manner as system 10. Finally, with regard to the system 10", while the network of grids has been shown for producing an AC field within chamber 56, a single pair of grids could be utilized to provide a single DC field such that the charged particles are caused to be attracted to one of the grids, specifically one disposed near the exit side of the chamber, for example, the inclined grid 60a.

What is claimed is:

1. A system for separating out a first group of polar particles from a second group in a mixture of the two, said first group including a first subgroup of particles having polar moments which are greater in magnitude than the polar moments of the second particles at a first given temperature and a second subgroup having polar moments which are greater in magnitude than the polar moments of the second particles at a second given temperature, said system comprising:
    (a) means defining a chamber including at least one chamber section containing spaced-apart electrode means;
    (b) particle collecting means carried by said electrode means and displaying an affinity for said first particles sufficient to retain them when these particles are in contact with the collecting means;
    (c) means cooperating with the spaced-apart electrode means in each chamber section for applying a non-uniform electric field therebetween;
    (d) means for placing said mixture of particles in each chamber section between adjacent electrode means therein whereby to subject said mixture to said non-uniform electric field; and
    (e) temperature providing means for providing said mixture of particles at said first given temperature when the mixture is in one of said chamber sections whereby said first subgroup of said first particles are attracted to the electrode means in said one chamber section faster than the second particles so as to be retained by said particle collecting means, said temperature providing means also providing said mixture of particles at said second given temperature when the mixture is in said one chamber section or another one of said chamber sections, at a different time, whereby said second subgroup of said first particles is attracted to the electrode means in said one or another chamber section faster than the second particles so as to be retained by the particle collecting means carried by the last-mentioned electrode means.

2. A particle separating system according to claim 1 wherein said first and second subgroups of said first group of polar particles include PCB molecules having varying dipole and higher moments, as evidenced by varying dielectric constants and wherein said second group of polar particles includes oil molecules.

3. A particle separating system according to claim 2, wherein said first given temperature is about −40° C. and wherein said second given temperature is about 100° C.

4. A particle separating system according to claim 1 wherein at least some of the particles in said first group have dipole moments which vary, at least to a limited extent, with the frequency of an electric field within which they are disposed and wherein each field applying means is such that the non-uniform electric field to which said mixture is subjected at said first and second temperature varies in frequency in a predetermined way.

5. A particle separating system according to claim 1 wherein said chamber includes a plurality of said sections and wherein said means for placing a mixture of particles in each of said chamber sections causes said mixture to flow in a continuous stream through successive ones of said sections and associated electric fields past successive electrode means.

6. A particle separating system according to claim 1 wherein said first group of particles includes TPCB molecules and wherein said particle collecting means includes neoprene.

7. A particle separating system according to claim 6 wherein each of said electrode means includes a grid member including a plurality of electrodes projecting outwardly towards an adjacent grid member and wherein each of said electrodes is coated with a layer of said neoprene.

8. A system for separating out a first group of polar particles from a second group in a mixture of the two, said first group including a first subgroup of particles having polar moments which are greater in magnitude than the polar moments of the second particles when all of these latter particles are subjected to an AC electric field at a first given frequency and a second subgroup having polar moments which are greater in magnitude than the polar moments of the second particles when all of these latter particles are placed in an AC electric field at a second given frequency, said system comprising:
(a) means defining a chamber including a plurality of chamber sections containing spaced-apart electrode means;
(b) particle collecting means carried by said electrode means and displaying an affinity for said first particles sufficient to retain them when these particles are in contact with the collecting means;
(c) means cooperating with the spaced-apart electrode means in each chamber section for applying a non-uniform AC electric field therebetween, said field providing means providing fields at said first given frequency and at said second given frequency either at separate times in the same chamber section or in separate chamber sections; and
(d) means for placing said mixture of particles in each chamber section between adjacent electrode means therein so as to subject said mixture to said non-uniform electric field at each of said given frequencies, whereby said first and second subgroups of first particles are attracted to the electrode means in the chamber section or sections in an AC field or fields at said first and second given frequencies faster than the second particles so as to be retained by said particle collecting means.

9. A system for separating out a first group of polar particles having polar moments of given magnitude from a second group of polar particles having polar moments of lesser magnitude in a mixture of the two, said system comprising:
(a) means defining an internal chamber having an inlet end and an outlet end;
(b) means located near the inlet end of said chamber for directing therein a plurality of electrically charged particles, said charged particles being selected to display an affinity for said first polar particles sufficient to absorb these particles when they are in contact therewith and also serving to provide a non-uniform electric field within said chamber because of their charges;
(c) means disposed within said chamber for producing a second electric field therein sufficient to cause said charged particles to move through said chamber towards said outlet end; and
(d) means for placing said mixture into said chamber through its inlet end as said charged particles enter said chamber whereby to cause said charged particles to transfer some of their momentum to said mixture so as to cause the latter to move through said chamber towards said outlet with said charged particles and, at the same time, said mixture being subjected to said non-uniform electric field whereby the first polar particles are attracted to said charged particles at a faster rate than said second polar particles in order to be separated from the mixture and be absorbed by the charged particles.

10. A system according to claim 9 including a collection chamber for said charged particles located near the outlet end of the latter and in fluid communication with said chamber, said means for producing said second field including means for directing said charged particles towards said collecting chamber just before said charged particles reach the outlet of said chamber.

* * * * *